United States Patent Office 3,769,423
Patented Oct. 30, 1973

3,769,423
COMBATTING BACTERIA AND FUNGI WITH CYANOCARBAMOYLOXIMES
Adolf Hubele, Riehen, Switzerland, assignor to Ciba-Geigy AG, Basel, Switzerland
No Drawing. Original application Nov. 7, 1967, Ser. No. 681,101, now Patent No. 3,625,987, dated Dec. 7, 1971. Divided and this application May 26, 1971, Ser. No. 147,192
Claims priority, application Switzerland, Nov. 10, 1966, 16,259/66
Int. Cl. A01n 9/06; A61k 27/00
U.S. Cl. 424—304
12 Claims

ABSTRACT OF THE DISCLOSURE

The present invention relates to new carbamates of the general formula $$\begin{array}{c} NC \\ \phantom{NC}\diagdown \\ \phantom{NCNC}C=N-O-CO-N \\ \phantom{NC}\diagup \phantom{NCNCNCN}\diagdown \\ R_1-CO \phantom{NCNCNCNCNC} R_3 \end{array} \quad R_2$$

in which $R_1$ represents an alkoxy, aralkoxy, cycloalkoxy, aryloxy, alkylthio, aralkylthio, cycloalkylthio or arylthio radical, or in which $R_1$ represents a secondary or tertiary amido group, $R_2$ represents a hydrogen atom or a lower aliphatic radical and $R_3$ represents a hydrogen atom, a lower aliphatic radical or an unsubstituted or substituted aryl radical.

The new compounds can be prepared by reaction of a cyanacetic acid ester or cyanacetic acid amide with an agent yielding nitrous acid and further reaction of the resulting oxime with either an isocyanate or a carbamic acid halide. The resulting carbamates are advantageously used as active substances for combatting various kinds of pests, especially in preparations for combatting bacteria and fungi affecting animals and plants. Those separations may comprise, if desired, other known additives and pesticides.

---

This application is a division of my application Ser. No. 681,101, filed on Nov. 7, 1967, now U.S. Pat. No. 3,625,987, issued Dec. 7, 1971.

The present invention provides pesticidal preparations containing as active ingredient at least one carbamate of the general formula $$\begin{array}{c} NC \\ \phantom{NC}\diagdown \\ \phantom{NCNC}C=N-O-C-N \\ \phantom{NC}\diagup \phantom{NCNCNCN}\| \phantom{N}\diagdown \\ R_1-C \phantom{NCNCNCNCN} O \phantom{NC} R_3 \\ \phantom{R_1-}\| \\ \phantom{R_1-}O \end{array} \quad R_2 \quad (I)$$

in which $R_1$ represents an alkoxy, aralkoxy, cycloalkoxy, aryloxy, alkylthio, aralkylthio, cycloalkylthio or arylthio residue, or in which $R_1$ represents a secondary or tertiary amido group, $R_2$ represents a hydrogen atom or a lower aliphatic residue and $R_3$ represents a hydrogen atom or a lower aliphatic residue or an unsubstituted or substituted aryl residue, if desired in admixture with a suitable carrier. The term "suitable carrier" refers to carriers in the widest sense, for example, solvents, diluents, emulsifiers, dispersants, bonding agents, adhesives and thickeners.

The preparations of the present invention may contain the active ingredient of the Formula I either alone or in admixture with one or more other known pesticides and/or herbicides.

When $R_1$ represents a secondary amido group, the substituent may be of an aliphatic, araliphatic or aromatic nature.

An aliphatic residue may be, for example, an alkyl, alkenyl, alkinyl, alkoxyalkyl, alkylthioalkyl, halogenalkyl, cyanoalkyl or a carbalkoxyalkyl group. An araliphatic or aromatic residue may be unsubstituted or contain one or more substituents, for example, lower alkyl, alkoxy, alkylthio, alkylsulphinyl, alkylsulphonyl groups, cyano, nitro or trifluoromethyl groups, lower dialkylamino groups and especially halogen atoms.

The substituents may also be present when $R_3$ is a substituted aromatic radical.

The present invention especially provides pesticidal preparations containing as active ingredient at least one carbamate of the general formula $$\begin{array}{c} NO \\ \phantom{NO}\diagdown \\ \phantom{NONO}C=N-O-C-N \\ \phantom{NO}\diagup \phantom{NONONON}\| \phantom{N}\diagdown \\ R_1-C \phantom{NONONONON} O \phantom{NO} R_3 \\ \phantom{R_1-}\| \\ \phantom{R_1-}O \end{array} \quad R_2 \quad (Ia)$$

in which $R_1$ represents an alkoxy, aralkoxy, cycloalkoxy or aryloxy group or a mono- or dialkylamido group, or an arylamido group which may be substituted by halogen atoms, $NO_2$, $CF_3$ and/or a methyl group, or $R_1$ represents a pyrrolidino, piperidino, morpholino, N'-alkylpiperazino or N-azepino group, $R_2$ represents a hydrogen atom or a lower alkyl radical and $R_3$ a lower alkyl or halogenalkyl radical or a phenyl radical which may be substituted by one or more halogen atoms, especially chlorine atoms, or by one or more alkyl, alkoxy, nitro and/or trifluoromethyl groups.

The new carbamates of the Formula I and Ia are distinguished by especially valuable biological activities. For example, they act as microbicides, especially against bacteria and fungi affecting humans, animals and plants. Furthermore, they have an insecticidal and acaricidal effect and, when used in high concentrations, a herbicidal effect.

They further act against pests that infest waters or muddy moist soil, for example, algae, Sedentaria, Myxobacteria, etc., and also mollusks. The following compounds are distinguished by a distinctly strong effect against phytopathogenic fungi, for example, Alternaria solani, Septoria apii, Erysiphe, phytopathogenic bacteria and other pests:

(a) $CH_3OOC-C(CN)=N-O-C(O)-NH-C_6H_3(CF_3)(Cl)$ (b) $C_2H_5OOC-C(CN)=N-O-C(O)-NH-C_6H_3(CF_3)(Cl)$ (c) $C_2H_5OOC-C(CN)=N-O-C(O)-NH-C_6H_3(CF_3)(CF_3)$ (d) $CH_3OOC-C(CN)=N-O-C(O)-NH-C_6H_3(Cl)(Cl)$ (e) $CH_3OOC-C(CN)=N-O-C(O)-NH-C_6H_4(Cl)$ (f) (piperidino)$-CO-C(CN)=N-O-C(O)-NH-C_6H_3(Cl)(Cl)$ (g) $C_6H_4(H)-O-OC-C(CN)=N-O-C(O)-NH-C_6H_4(Cl)$ (h) $(CH_3)_2N-CO-C(CN)=N-O-C(O)-NH-C_6H_3(Cl)(Cl)$ The present invention also provides carbamates of the general formula

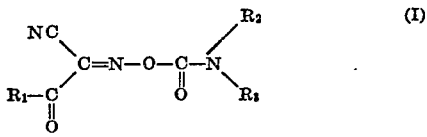

in which $R_1$ represents an alkoxy, aralkoxy, cycloalkoxy, aryloxy, alkoylthio, aralkylthio, cycloalkylthio or arylthio residue, or in which $R_1$ represents a secondary or tertiary amido group, $R_2$ represents a hydrogen atom or a lower aliphatic residue, and $R_3$ represents a hydrogen atom or an aliphatic residue or an unsubstituted or substituted aryl radical.

The present invention also provides a process for preparing the carbamates of the Formula I and Ia, wherein a cyanacetic ester or a cyanacetamide of the formula

in which $R_1$ has the meaning defined above, is oximated with nitrous acid or an agent giving nitrous acid, and the resulting oximino compound of the formula

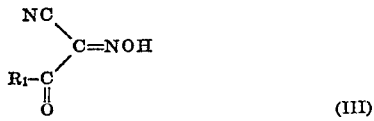

is reacted either with an isocyanate of the formula $$O=C=N-R_3 \quad (IV)$$

so that $R_2$ corresponds to a hydrogen atom or with a carbamic acid halide of the formula

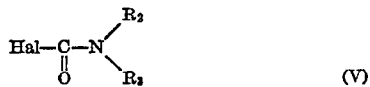

in which $R_2$ and $R_3$ have the above meanings and Hal is halogen atom, preferably a chlorine atom.

The oximation of a cyanacetic acid derivative of the Formula II may be carried out, for example, with an alkali metal nitrite in an aqueous acetic acid solution.

When $R_1$ in the Formula II represents, for example, a phenoxy residue, it is advantageous to perform the oximation under rather mild conditions, for example, with butylnitrite or amylnitrite in an organic solution. Examples of suitable organic solvents are ether and ethyl acetate.

The reaction of the oximino compound of the Formula III with an isocyanate of the Formula IV is advantageously carried out in an organic solvent that is free from hydroxyl groups, for example, acetonitrile, benzene, toluene and xylene. To accelerate the addition, a catalytic amount of a tertiary base, for example, triethylamine or triethylenediamine, may be added.

The reaction of the oximino compound of the Formula III with a carbamic acid halide of the Formula V is carried out in a similar manner, advantageously at a relatively low temperature, using an alkali metal salt of (III) as starting compound.

The following examples illustrate the invention. Unless stated as being parts by volume, the parts are parts by weight.

EXAMPLE 1

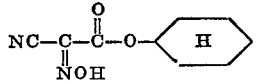

While cooling with ice and stirring a mixture of 1060 parts of cyanacetic acid cyclohexyl ester and 500 parts of sodium nitrite in 600 parts by volume of water, 480 parts of glacial acetic acid are stirred in dropwise during 15 minutes, during which period the temperature rises to 40° C. After 3 hours, the whole is diluted with ice water, acidified with dilute hydrochloric acid and extracted with ether, dried and evaporated and the residue is recrystallized from xylene. The product melts at 103–104° C.

EXAMPLE 2

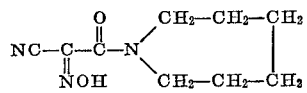

432 parts of glacial acetic acid are dropped during ½ hour at 40° C. into 753 parts of cyanacetic acid hexamethyleneimide and 477 parts of sodium nitrite in 1500 parts by volume of water. After 6 hours, the whole is diluted with ice water, acidified with hydrochloric acid, filtered and recrystallized from ethanol. The product melts at 165–167° C. with decomposition.

EXAMPLE 3

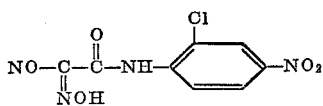

360 parts of glacial acetic acid are added during 5 minutes at 35° C. to 800 parts of cyanacetic acid-[2-chloro-4-nitranilide] and 300 parts of sodium nitrite in 1500 parts by volume of water and 2000 parts by volume of dioxan. After 10 minutes the temperature of the solution reaches 40° C. and the solution is maintained at this temperature by cooling. After 4 hours the whole is diluted with ice water, acidified with hydrochloric acid, filtered and rinsed with water. The product melts at 213–214° C. with decomposition.

EXAMPLE 4

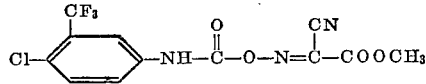

128 parts of oximino-cyanacetic acid methyl ester and 222 parts of 4-chloro-3-trifluoromethylphenylisocyanate are dissolved at 20° C. in 200 parts by volume of acetonitrile and 800 parts by volume of toluene. The reaction is triggered off by adding 1 part of triethylenediamine. After 12 hours the whole is diluted with petroleum ether (50–70° C.), cooled and filtered. The product, Compound No. 1, melts at 162–163° C.

EXAMPLE 5

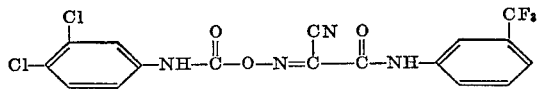

64.3 parts of oximino-cyanacetic acid-[3-trifluoromethylanilide] and 47 parts of 3,4-dichlorophenylisocyanate are dissolved at 20° C. in 30 parts by volume of acetonitrile and 300 parts by volume of toluene. 0.5 part of triethylenediamine is added, the whole heated for 2 minutes at 40° C., then kept for 12 hours at 20° C., diluted with petroleum ether, cooled and filtered. The product, Compound No. 2, melts at 160–161° C. with decomposition.

EXAMPLE 6

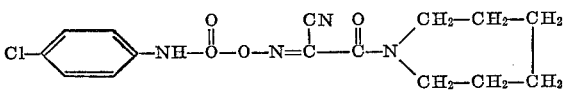

39 parts of oximino-cyanacetic acid-hexamethyleneimide and 30.7 parts of 4-chlorophenylisocyanate are dissolved at 20° C. in 10 parts by volume of acetonitrile and 400 parts by volume of toluene. 0.5 part of trietyhlenediamine is added, the whole heated for 2 minutes at 50° C., then kept for 12 hours at room temperature, cooled, filtered and recrystallized from acetonitrile. The product, Compound No. 3, melts at 125–127° C.

In an identical manner, the following carbamates of the general Formula I can be manufactured:

| Compound number | $R_1$ | $R_2$ | $R_3$ | M.P., °C. |
|---|---|---|---|---|
| 4 | $-OC_2H_5$ | H | -phenyl(2-$CF_3$, 3-Cl) 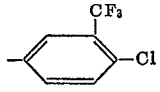 | 141–142 |
| 5 | $-OC_2H_5$ | H | -phenyl(2-Cl, 3-Cl) 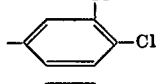 | 160–161 |
| 6 | $-OC_2H_5$ | H | -phenyl 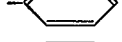 | 130–132 |
| 7 | $-OC_2H_5$ | H | -phenyl(4-$NO_2$) 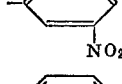 | 145–147 |
| 8 | $-OC_2H_5$ | H | -phenyl(4-Cl) 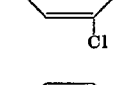 | 139–141 |
| 9 | $-OC_2H_5$ | H | -phenyl(4-$O-CH_2-CH(CH_3)_2$) 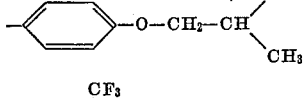 | 127–128 |
| 10 | $-OC_2H_5$ | H | -phenyl(2-$CF_3$, 4-$CF_3$) 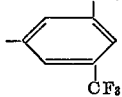 | 155–157 |
| 11 | $-OC_2H_5$ | H | -phenyl(3-$CF_3$) 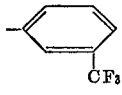 | 117–119 |
| 12 | $-OC_2H_5$ | H | $-CH_3$ | 104–106 |
| 13 | $-OC_2H_5$ | H | $-CH_2-CH_2-Cl$ | 73–75 |
| 14 | $-OCH_3$ | H | -phenyl(2-$CF_3$) 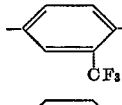 | 147–148 |
| 15 | $-OCH_3$ | H | -phenyl 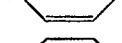 | 149–150 |
| 16 | $-OCH_3$ | H | -phenyl(4-$NO_2$) 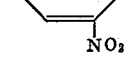 | 166–167 |
| 17 | $-OCH_3$ | H | -phenyl(4-$O-CH_2-CH(CH_3)_2$) 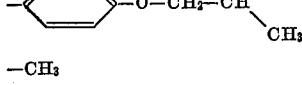 | 127–128 |
| 18 | $-OCH_3$ | H | $-CH_3$ | 122–123 |
| 19 | $-OCH_3$ | H | -phenyl(4-Cl) 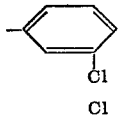 | 162–163 |
| 20 | $-OCH_3$ | H | -phenyl(2-Cl, 3-Cl) 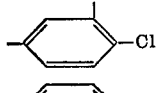 | [1] 162–163 |
| 21 | $-OCH_3$ | H | -phenyl(4-Cl) 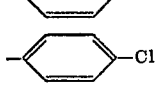 | 157–158 |
| 22 | $-OCH(CH_3)-CH_2-CH_3$ 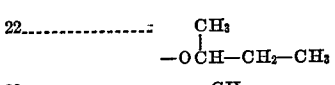 | H | -phenyl(4-Cl) 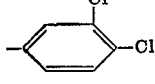 | 128–130 |
| 23 | $-O-CH(CH_3)-CH_2-CH_3$ 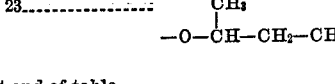 | H | -phenyl(2-Cl, 3-Cl)  | 140–141 |

See footnote at end of table.

| Compound number | R₁ | R₂ | R₃ | M.P., °C. |
|---|---|---|---|---|
| 24 | −O−CH(CH₃)−CH₂−CH₃ | H | −C₆H₃(Cl)(CF₃) | 126–127 |
| 25 | −O−CH(CH₃)−CH₂−CH₃ | H | −CH₃ | 80–81 |
| 26 | −O−C₆H₅ | H | −C₆H₄−Cl | 141–142 |
| 27 | −O−C₆H₅ | H | −C₆H₃(Cl)(CF₃) | 131–132 |
| 28 | −O−C₆H₅ | H | −C₆H₃(Cl)(Cl) | 162–163 |
| 29 | −O−C₆H₅ | H | −CH₃ | 99–101 |
| 30 | −N(CH₃)₂ | H | −C₆H₃(Cl)(Cl) | 153–154 |
| 31 | −N(CH₃)₂ | H | −C₆H₃(Cl)(CF₃) | 154–156 |
| 32 | −NH−C₆H₄−CF₃ | H | −C₆H₅ | [1] 161–163 |
| 33 | −NH−C₆H₄−CF₃ | H | −C₆H₄−Cl | [1] 178–180 |
| 34 | −NH−C₆H₄−CF₃ | H | −C₆H₃(Cl)(CF₃) | [1] 167–169 |
| 35 | −NH−C₆H₃(Cl)(Cl) | H | −C₆H₅ | [1] 177–179 |
| 36 | −NH−C₆H₃(Cl)(Cl) | H | −C₆H₄−Cl | [1] 170–172 |
| 37 | −NH−C₆H₃(Cl)(Cl) | H | −C₆H₃(Cl)(Cl) | [1] 173–176 |
| 38 | −NH−C₆H₃(Cl)(Cl) | H | −C₆H₃(Cl)(CF₃) | [1] 160–162 |
| 39 | −N(C₅H₁₀) | H | −C₆H₅ | 143–144 |
| 40 | −N(C₅H₁₀) | H | −C₆H₄−Cl | 142–144 |
| 41 | −N(C₅H₁₀) | H | −C₆H₃(Cl)(CF₃) | [1] 138–140 |
| 42 | −N(C₅H₁₀) | H | −CH₃ | [1] 111–113 |
| 43 | −N(C₆H₁₂) | H | −C₆H₅ | 124–125 |

| Compound number | R₁ | R₂ | R₃ | M.P., °C |
|---|---|---|---|---|
| 44 | -N(CH₂)₆ (hexamethyleneimino) | H | 3,4-dichlorophenyl | 155–157 |
| 45 | -N(CH₂)₆ | H | 4-Cl-3-CF₃-phenyl | ¹ 143–145 |
| 46 | -N(CH₂)₆ | H | -CH₃ | ¹ 89–90 |
| 47 | -N(CH₂)₅O (homomorpholino) | H | 4-Cl-phenyl | 159–161 |
| 48 | -N(CH₂)₅O | H | 4-CF₃-phenyl | 130–132 |
| 49 | -N(CH₂)₅O | H | 4-Cl-3-CF₃-phenyl | 176–178 |
| 50 | CH₃O— | H | 3-Cl-phenyl | 136–138 |
| 51 | CH₃O— | H | 4-CF₃-phenyl | ¹ 139–140 |
| 52 | CH₃O— | H | 3-Cl-4-Br-phenyl | 170–171 |
| 53 | CH₃O— | H | 2,5-dichlorophenyl | 164–165 |
| 54 | CH₃O— | H | 2-CH₃-3-Cl-phenyl | 118–120 |
| 55 | CH₃O— | H | 4-Cl-3-CH₃-phenyl | 119–120 |
| 56 | CH₃O— | H | 4-CH₃-3-Br-phenyl | 134–135 |
| 57 | CH₃O— | H | 3,4-dimethylphenyl | 115–117 |
| 58 | CH₃O— | H | 4-NO₂-3-Cl-phenyl | ¹ 165–166 |
| 59 | CH₃O— | H | 2,4,5-trichlorophenyl | 143–145 |
| 60 | CH₃O— | H | —CH₂—CH₂Cl | 72–74 |
| 61 | C₂H₅O— | H | 3-Cl-phenyl | 81–83 |

See footnotes at end of table.

| Compound number | R₁ | R₂ | R₃ | M.P., °C. |
|---|---|---|---|---|
| 62 | Same as Example 61 | H | –C₆H₄–Cl | 156–157 |
| 63 | Same as above | H | –C₆H₄–CF₃ | 136–137 |
| 64 | do | H | –C₆H₄–CH₃ | 121–122 |
| 65 | do | H | –C₆H₃(Cl)(Cl) (2,6-diCl) | 136–137 |
| 66 | do | H | –C₆H₃(Cl)(NO₂) | 133–134 |
| 67 | do | H | –C₆H₃(CH₃)(Cl) | 90–91 |
| 68 | do | H | –C₆H₂(Cl)₃ | 137–139 |
| 69 | CH₃–CH₂–CH(CH₃)O– | H | –C₆H₄–CF₃ | 93–95 |
| 70 | Same as above | H | –C₆H₄–CF₃ | 109–110 |
| 71 | do | H | –C₆H₃(Cl)(Cl) | 100–101 |
| 72 | do | H | –CH₂–CH₂Cl | 57–59 |
| 73 | CH₃–(CH₂)₁₅O– | H | –C₆H₄–Cl | 100–103 |
| 74 | CH₃(CH₂)₁₅O– | H | –C₆H₄–CF₃ | 96–98 |
| 75 | Same as above | H | –C₆H₄–CF₃ | 106–107 |
| 76 | do | H | –C₆H₃(Cl)(Cl) | ¹ 110–112 |
| 77 | CH₂=CH–CH₂O– | H | –C₆H₅ | 103–105 |
| 78 | CH₂=CH–CH₂O– | H | –C₆H₄–Cl | 118–120 |
| 79 | Same as above | H | –C₆H₄–Cl | 131–132 |
| 80 | do | H | –C₆H₄–CF₃ | 106–107 |
| 81 | CH₂=CH–CH₂O– | H | –C₆H₄–CF₃ | 121–123 |
| 82 | CH₂=CH–CH₂O– | H | –C₆H₃(Cl)(Cl) | 126–127 |

See footnotes at end of table.

| Compound number | R₁ | R₂ | R₃ | M.P., °C. |
|---|---|---|---|---|
| 83 | CH₂=CH—CH₂—O— | H | 2,4-diClC₆H₃— | 130–131 |
| 84 | CH₂=CH—CH₂O— | H | 2,4,5-triClC₆H₂— (Cl,Cl,Cl) | 124–126 |
| 85 | CH₂=CH—CH₂O— | H | —CH₂—CH₂Cl | 61–63 |
| 86 | C₆H₅—O— | H | 4-CF₃C₆H₄— | 94–96 |
| 87 | C₆H₅—O— | H | 3,4-diClC₆H₃— (Cl,Cl) | 124–126 |
| 88 | C₆H₅—CH=CH—CH₂O— | H | 3-ClC₆H₄— | ¹ 136 |
| 89 | Same as above | H | 3,4-diClC₆H₃— | ¹ 137–138 |
| 90 | do | H | 2,4,5-triClC₆H₂— | ¹ 161 |
| 91 | piperidino (—N(CH₂)₅—) | H | 3-ClC₆H₄— | 120–123 |
| 92 | Same as above | H | 4-CF₃C₆H₄— | 160–162 |
| 93 | do | H | Same as above | 133–135 |
| 94 | do | H | 3,4-diClC₆H₃— | 153–154 |
| 95 | do | H | 2-Cl-4-NO₂-C₆H₃— | ¹ 164–165 |
| 96 | do | H | 2,4,5-triClC₆H₂— | 143–145 |
| 97 | 2,4-diClC₆H₃—NH— | H | 3-ClC₆H₄— | 153–154 |
| 98 | Same as above | H | 4-CF₃C₆H₄— | ¹ 164–165 |
| 99 | do | H | Same as above | ¹ 151–152 |
| 100 | 2,4-diClC₆H₃—NH— | H | 2,4-diClC₆H₃— | ¹ 184–185 |

See footnotes at end of table.

| Compound number | R₁ | R₂ | R₃ | M.P., °C. |
|---|---|---|---|---|
| 101 | Same as Example 100 | H | 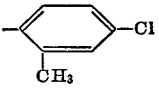 (4-Cl, 3-CH₃ phenyl) | [1] 153–154 |
| 102 | Same as above | H | 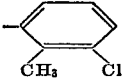 (3-CH₃, 4-Cl phenyl) | [1] 139–140 |
| 103 | do | H | 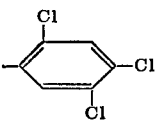 (3,4,5-triCl phenyl) | [1] 171–172 |
| 104 | 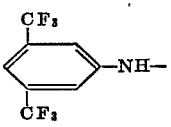 (2,6-bis-CF₃ phenyl-NH–) | H | 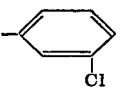 (3-Cl phenyl) | [1] 164–165 |
| 105 | Same as above | H | 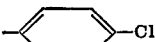 (4-Cl phenyl) | [1] 178–179 |
| 106 | do | H | 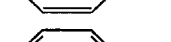 (4-CF₃ phenyl) | [1] 187–188 |
| 107 | 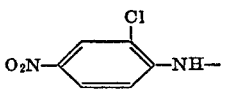 (2-Cl, 4-O₂N phenyl-NH–) | H | 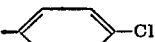 (4-Cl phenyl) | [1] 185–187 |
| 108 | Same as above | H | 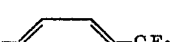 (4-CF₃ phenyl) | [1] 197–198 |
| 109 | do |  | 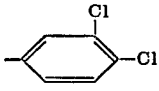 (3,4-diCl phenyl) | [1] 196–198 |
| 110 | do | H | 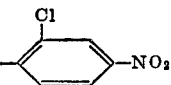 (3-Cl, 4-NO₂ phenyl) | [1] 184–185 |
| 111 | 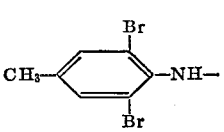 (2,6-diBr, 4-CH₃ phenyl-NH–) | H | 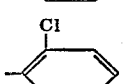 (2,4-diCl phenyl) | [1] 120 |
| 112 | CH₃O— | CH₃— | CH₃— | 105–106 |
| 113 | 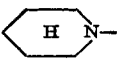 (piperidino, H,N–) | CH₃— | CH₃— | 104–105 |
| 114 | 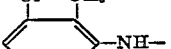 (2-Cl, 3-CH₃ phenyl-NH–) | CH₃— | CH₃— | [1] 163–164 |
| 115 | 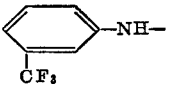 (4-CF₃ phenyl-NH–) | CH₃— | CH₃— | 115–117 |
| 116 | 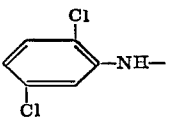 (2,4-diCl phenyl-NH–) | CH₃— | CH₃— | 162–164 |
| 117 | 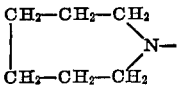 (piperidino CH₂CH₂CH₂–N–CH₂CH₂CH₂) | CH₃— | CH₃— | 71–72 |

[1] Decomp.

EXAMPLE 7

(A) A spray powder of the following composition was manufactured:

250 g. of compound No. 1
502.5 g. of chalk
165 g. of purified sulphite cellulose waste liquor (Peridan NH₄ is a registered trademark)
67.5 g. of sodium methylene bis-naphthalenedisulphonate
15 g. of a condensation product of 1 mol of p-tertiary octylphenol with about 6 to 8 mols of ethylene oxide.

The mixture is finely ground and can then be diluted with water in any desired proportion to form a spray broth ready for use.

(B) A spray powder of the following composition was manufactured:

50% of Compound No. 12
25% of bolus alba (kaolin)
20% of finely divided silica (product marketed under the trademark HISIL)
3.5% of a condensation product of 1 mol of dodecylmercaptan with 12 mols of ethylene oxide
1.5% of a condensation product of para-nonylphenol with 9 mols of ethylene oxide.

The resulting, finely ground mixture can be diluted with water in any desired proportion to form a spray broth ready for use.

EXAMPLE 8

Compound No. 12 is distinguished by its herbicidal activity in the pre-emergence and post-emergence methods against mono- and dicotylous plants. Other, similarly constituted carbamates and N-aryl-substituted carbamates act in a similar manner, for example, Compounds 20, 25 and 28, when used in an amount within the range of from 1 and 2.5 kg. per hectare.

EXAMPLE 9

The effect of the compounds of this invention against leaf spot fungi was tested on celery (*Apium graveolens* L.) with the fungus *Septoria apii* Chest.

Celery plants were grown in the greenhouse and two days before infection sprayed once with a broth containing 0.1% of the active ingredient of the product under test. After infection with an aqueous suspension of spores of *Septoria apii* the plants were incubated in a room having a humid atmosphere at room temperature and then the degree of their infestation, compared with an untreated control specimen (0% effect), was determined.

The effect of Compound No. 5 was 100%, without phytotoxicity. The following compounds displayed a similar effect: Nos. 1, 2, 4, 10, 16, 17, 23, 24, 26, 27, 28, 30, 31, 34, 37, 38, 41, 43, 44, 45, 47, 49, 86, 107 and 109.

EXAMPLE 10

The effect of the compounds of this invention against leaf spot fungi was confirmed on tomatoes (*Solanum hycopersicum* L.) with the fungus *Alternaria solani* (E. et M.) J. et Gr.

Tomato plants were grown in the greenhouse and two days before the infection sprayed once with a broth containing 0.1% of the active ingredient of the product under test. After infection with an aqueous suspension of spores of Alternaria solani the plants were incubated in a room having a humid atmosphere at room temperature and the degree of their infestation was compared with that of untreated controls (0% effect).

Compound No. 48 displayed a 100% effect without phytotoxicity. The following compounds displayed a similar effect: 3, 23, 26, 33, 36, 37, 38 and 96 (systemic).

EXAMPLE 11

The compounds of this invention are distinguished by effects against powdery mildew.

Zucchetti plants (*Cucurbita pepo* L.) were grown in the greenhouse and given one prophylatic spray with an aqueous broth of the product under test containing 0.1% of active substance. Two days after this treatment the plants were infected with spores of *Erysiphe cichoriacearum* DC. and after 12–14 days the degree of fungus infestation was determined.

Compared with the untreated control (0% effect) Compound No. 1 had a 95% effect on the sprayed plants, without phytotoxicity. The following preparations had a similar effect: Nos. 4, 10, 19, 20, 26 and 79.

EXAMPLE 12

1-year improved Jonathans were sprayed 10 times with the solution of the active substance during the vegetation period at 10-day intervals, beginning on May 17, 1966. Ten small trees were treated. The spray broth was prepared by dispersing 0.1% of the active substance in water. Each plant was sprayed with 7 litres of the aqueous suspension.

On Sept. 14, 1966, the amount of infestation by *Podosphaera leucotricha* (Ell. et Ev.) Salm. was determined by inspecting 200 leaves on each of 5 equally developed plants.

The results in percent are shown in the following table. For comparison, the table further contains the results obtained with a known fungicide against apple mildew, namely 24-dinitro-6-(2-octyl)-phenylcrotonate (A):

TABLE

| Substance tested | Concentration, percent | Infestation, percent |
|---|---|---|
| Compound No. 1 | 0.1 | 9.1 |
| A | 0.12 | 16 |
| Untreated | | 46 |

EXAMPLE 13

Compounds 1 and 20 are distinguished by their strong acaricidal effects.

Compounds 17, 20, 26, 33, 59 and 87 have a strong ovicidal effect against T. Kühniella.

EXAMPLE 14

Determining the minimal inhibitory concentration (MIC) against bacteria and fungi in the dilution test The MIC (minimal inhibitory concentration) is determinated by a test based upon standard specifications which affords an approximation to the absolute minimal inhibitory values of an active substance.

A solution of 1% and 0.3% strength each of the active substance in dimethylsulfoxide is introduced into little tubes containing sterile glucose broth and with these solutions dilution series in decades are prepared. By combining the two series the following continuous dilution series is obtained: 1000, 300, 100, 30, 10, 3 p.p.m. etc.

The solutions are inoculated with the bacterium *Staphylococus aureus* and then incubated for 48 hours at 37° C. to determine the bacteriostatic effect.

After the times mentioned, the following minimal inhibitory values in parts per million are obtained:

| Compound No.: | MIC in parts per million |
|---|---|
| 1 | 1 |
| 2 | 3 |
| 4 | 1 |
| 5 | 1 |
| 10 | 10 |
| 11 | 10 |
| 14 | 10 |
| 20 | 3 |
| 23 | 1 |
| 24 | 3 |
| 27 | 3 |
| 28 | 3 |
| 30 | 1 |
| 37 | 3 |
| 38 | 1 |
| 41 | 1 |
| 44 | 1 |
| 45 | 1 |
| 48 | 10 |
| 109 | 10 |

EXAMPLE 15

The under-mentioned compounds killed off *Australorbis glabratus* completely with a concentration of No. 69, 3 parts per million and under; No. 105, 3 parts per million and under.

EXAMPLE 16

The following compounds displayed a strong lethal effect against Orgyiagonost.: Nos. 33, 107 and 109.

Compound No. 33 acts also against *Prodenia litura*.

EXAMPLE 17

When used in very low concentrations (100 parts per million or less) compounds 53 and 65 have a very strong lethal effect against *Ripicephalus bursa*.

What is claimed is:

1. A preparation for combatting pathogenic bacteria and fungi comprising a bactericidally or fungicidally effective amount of (1) a carbamate of the formula $$\begin{array}{c}NC\\ \phantom{N}\diagdown\\ \phantom{NCC}C=N-O-C-N \diagup R_2\\ R_1-C \diagup \phantom{==N-O-}\parallel \phantom{-N} \diagdown R_3\\ \parallel \phantom{===================}O\\ O\end{array}$$

in which $R_1$ represents a member selected from the group consisting of alkoxy having from 1 to 16 carbon atoms, cyclohexyloxy, allyloxy, phenylallyloxy, di lower alkylamino, and phenylamino substituted by at least one of chloro, bromo, trifluoromethyl, lower alkyl or nitro, $R_2$ represents hydrogen or lower alkyl, and $R_3$ represents hydrogen, lower alkyl, chloroethyl, phenyl or phenyl substituted by at least one of chloro, bromo, trifluoromethyl, methyl, isobutoxy or nitro, and (2) a carrier.

2. A method of combatting phytopathogenic bacteria and fungi which comprises applying to plants infested with said bacteria and fungi a bactericidally or fungicidally effective amount of a compound of the formula $$\begin{array}{c}NC\\ \phantom{N}\diagdown\\ \phantom{NCC}C=N-O-C-N \diagup R_2\\ R_1-C \diagup \phantom{==N-O-}\parallel \phantom{-N} \diagdown R_3\\ \parallel \phantom{===================}O\\ O\end{array}$$

in which $R_1$ represents a member selected from the group consisting of alkoxy having from 1 to 16 carbon atoms, cyclohexyloxy, allyloxy, phenylallyloxy, di lower alkylamino, and phenylamino substituted by at least one of chloro, bromo, trifluoromethyl, lower, alkyl or nitro, $R_2$ represents hydrogen or lower alkyl, and $R_3$ represents hydrogen, lower alkyl, chloroethyl, phenyl or phenyl substituted by at least one of chloro, bromo, trifluoromethyl, methyl, isobutoxy or nitro.

3. A method according to claim 2 in which, in the compound, $R_3$ is lower alkyl, chloroethyl, phenyl or phenyl substituted by at least one of chloro, bromo. trifluoromethyl, methyl, isobutoxy or nitro.

4. A method according to claim 2 in which, in the compound, $R_1$ is phenylamino substituted by at least one of chloro, bromo, nitro, trifluoromethyl or alkyl of at most 4 carbon atoms.

5. A method according to claim 2 in which, in the compound, $R_1$ is methoxy, ethoxy or cyclohexyloxy, $R_2$ is hydrogen and $R_3$ is phenylamino substituted by one or two of chloro or trifluoromethyl.

6. A method according to claim 5 in which the compound is $$CH_3OOC-\underset{\underset{CN}{|}}{C}=N-O-\underset{\underset{O}{\|}}{C}-NH-\underset{}{\bigcirc}\!\!\!\overset{CF_3}{-}\!\!Cl$$

7. A method according to claim 2 in which the compound is $$C_2H_5OOC-\underset{\underset{CN}{|}}{C}=N-O-\underset{\underset{O}{\|}}{C}-NH-\underset{}{\bigcirc}\!\!\!\overset{CF_3}{-}\!\!Cl$$

8. A method according to claim 5 in which the compound is $$C_2H_5OOC-\underset{\underset{CN}{|}}{C}=N-O-\underset{\underset{O}{\|}}{C}-NH-\underset{\underset{CF_3}{|}}{\bigcirc}\!\!\!\overset{CF_3}{-}$$

9. A method according to claim 5 in which the compound is $$CH_3OOC-\underset{\underset{CN}{|}}{C}=N-O-\underset{\underset{O}{\|}}{C}-NH-\underset{\underset{Cl}{|}}{\bigcirc}\!\!\!-Cl$$

10. A method according to claim 5 in which the compound is $$CH_3OOC-\underset{\underset{CN}{|}}{C}=N-O-\underset{\underset{O}{\|}}{C}-NH-\underset{}{\bigcirc}\!\!\!-Cl$$

11. A method according to claim 5 in which the compound is $$\bigcirc\!\!\!-H\!\!-O-OC-\underset{\underset{CN}{|}}{C}=N-O-\underset{\underset{O}{\|}}{C}-NH-\bigcirc\!\!\!-Cl$$

12. A method according to claim 2 in which the compound is $$(CH_3)_2N-CO-\underset{\underset{CN}{|}}{C}=N-O-\underset{\underset{O}{\|}}{C}-NH-\underset{\underset{Cl}{|}}{\bigcirc}\!\!\!-Cl$$

References Cited

UNITED STATES PATENTS

| | | | |
|---|---|---|---|
| 2,925,434 | 2/1960 | Parker | 260—465 |
| 3,256,330 | 6/1966 | Kilsheimer et al. | 260—464 X |
| 3,328,457 | 6/1967 | Payne, Jr. | 260—464 |
| 3,466,316 | 9/1969 | Payne, Jr. et al. | 260—465.4 |

JEROME D. GOLDBERG, Primary Examiner

U.S. Cl. X.R.

424—244, 248, 250, 267, 274